United States Patent
Carlyon, Jr.

[15] 3,658,258
[45] Apr. 25, 1972

[54] AGRICULTURAL APPARATUS

[72] Inventor: Richard A. Carlyon, Jr., 751 North Edmonds Drive, Carson City, Nev. 89701

[22] Filed: Mar. 4, 1971

[21] Appl. No.: 120,826

Related U.S. Application Data

[62] Division of Ser. No. 840,804, July 10, 1969, Pat. No. 3,586,245.

[52] U.S. Cl. ............................................. 239/662, 239/127
[51] Int. Cl. ........................................................ A01c 17/00
[58] Field of Search .................................. 239/662, 124, 127

[56] References Cited

UNITED STATES PATENTS

| | | | |
|---|---|---|---|
| 3,586,245 | 6/1971 | Carlyon, Jr. | 239/127 X |
| 3,512,713 | 5/1970 | Carlyon, Jr. | 239/127 |
| 2,722,456 | 11/1955 | Glessner | 239/127 |

*Primary Examiner*—M. Henson Wood, Jr.
*Assistant Examiner*—Thomas C. Culp, Jr.
*Attorney*—Jessup & Beecher

[57] ABSTRACT

Improved agricultural apparatus is provided which, for example, may be mounted on the back of a truck, or a trailer, and which may be used conveniently and efficiently to mulch, fertilize and seed an area. The apparatus to be described includes a tank containing a slurry of the seed, mulch and fertilizer, and a circulating pump coupled to the tank for circulating the slurry around the system. In addition, a spray dispensing hose is coupled to the circulating line from the pump for receiving a portion of the circulating slurry to be sprayed over the area. A simple means is provided by which fresh water from a reservoir may be pumped into the system.

6 Claims, 2 Drawing Figures

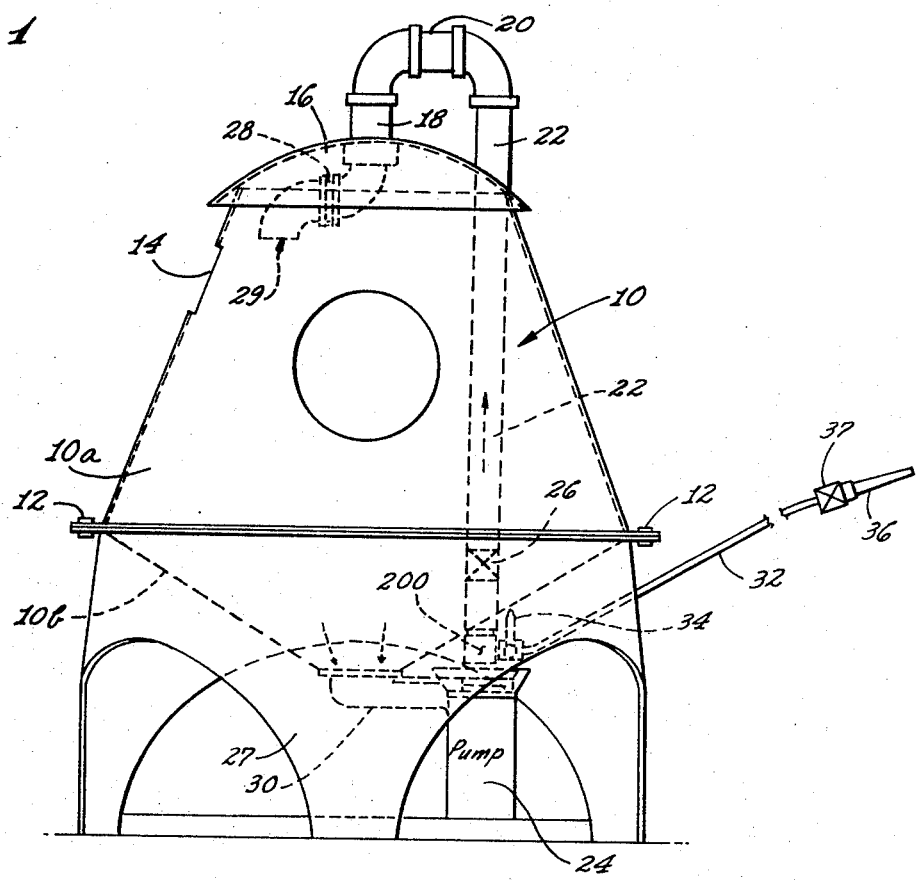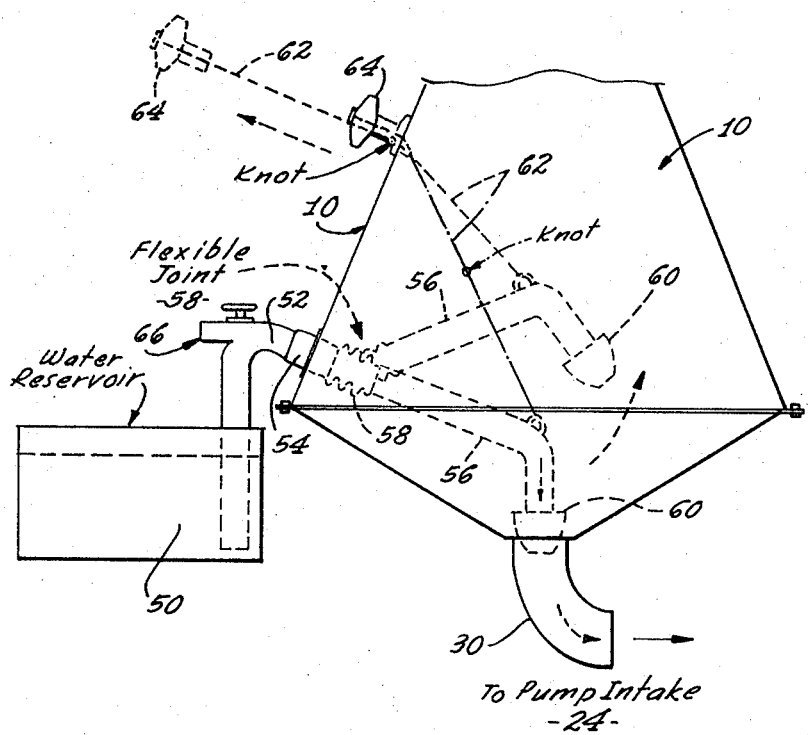

AGRICULTURAL APPARATUS

This application is a division of copending application Ser. No. 840,804 which was filed July 10, 1969 and which now has issued as U.S. Pat. No. 3,586,245 on June 22, 1971, in the name of the present inventor.

BACKGROUND OF THE INVENTION

The apparatus to be described herein is of the same general type as described in application Ser. No. 712,034 which was filed Mar. 10, 1968, and which now has issued as U.S. Pat. No. 3,512,713 on May 19, 1970.

As described in the aforesaid patent, agricultural apparatus is known which may be transported to a particular site, and which may be operated at the site to spray a slurry of seed, mulch and fertilizer over the area on which a lawn, or other ground cover, is to be grown. As also mentioned in the patent, such apparatus usually includes a tank, and a pump and hose which are used in conjunction with the tank. The tank and other components may be mounted, for example, on the back of a truck, or on a trailer, so that the apparatus may be conveniently moved from place to place. The tank may be filled with water at the site, and mulch, seed and fertilizer may be poured into the tank through a convenient chute. The ingredients are mixed with the water in the tank into a slurry either mechanically or manually in the prior art apparatus, and the slurry is then pumped through the hose and sprayed over the area to be covered, as the hose is manipulated by the operator.

The apparatus of the present invention is particularly concerned with an improved mechanism, whereby fresh water may be circulated conveniently from a reservoir into the tank by means of the circulating pump of the system, this feature being particularly useful in areas where there is no pressurized water supply.

BRIEF DESCRIPTION OF THE DRAWING

FIG. 1 is a side elevation of apparatus in which the mechanism of the invention may be incorporated; and FIG. 2 is a partial view of the apparatus of FIG. 1, and showing the combination and mechanism of the invention whereby fresh water from a reservoir may be pumped into the system by means of the circulating pump of the system.

DETAILED DESCRIPTION OF THE ILLUSTRATED EMBODIMENT

As shown in FIG. 1, for example, the apparatus includes a tank 10 having an upper section 10a and a lower section 10b, the upper and lower sections being joined together, for example, by bolts 12 which extend through corresponding flanges, with a rubber gasket or equivalent sealing means being interposed between the flanges. The tank 10 has a generally conical configuration. An opening 14 is provided at one side of the tank 10 to permit the seed, fertilizer and mulch to be introduced into the interior of the tank.

When make-up water is available from a pressurized source, it may also be introduced into the interior of the tank through the opening 14, for example, by means of a hose or other water line. However, and as will be described in conjunction with FIG. 2, when no pressurized source is available, the make-up fresh water may be drawn into the system by means of the mechanism and apparatus of the invention.

The tank 10 includes a lid 16, and a power head 18, such as described and claimed in copending application Ser. No. 840,804, is supported on the lid 16. A coupling assembly designated generally as 20, couples the power head 18 to a standpipe 22. The standpipe 22 extends through the tank 10 from the outlet of a pump 24 mounted within a leg assembly 27, the leg assembly serving to support the tank 10 in an upright position. A valve 26 is mounted on the standpipe 22, and it may be closed when it is desired to prevent the output from the pump from reaching the power head 18.

A rotating nozzle assembly 28 extends down from the power head 18 into the interior of the tank 10. In the manner described in the aforesaid copending application Ser. No. 840,804, a nozzle 29 is coupled to the rotating assembly 28, and the nozzle is constructed to introduce fluid at an angle into the tank 10, so that when pressurized fluid is fed to the nozzle 29 through the power head 18, the nozzle rotates about the axis of the power head. During the operation of the apparatus, the nozzle 29 rotates slowly distributing the returning circulated slurry evenly over the entire surface of the slurry within the tank 10, and at the same time driving the slurry within the tank downwardly, and thereby violently agitating it. Such action prevents the solid ingredients of the slurry from floating to the surface and separating.

The intake 30 of the pump 24 is coupled to the bottom of the tank 10, as shown in FIG. 1. Therefore, when the valve 26 is opened, and the pump 24 is operated, the slurry is caused to circulate from the bottom of the tank 10 through the intake 30 and through the pump 24. The discharge from the pump is then circulated through the valve 26 and standpipe 22, through the power head coupling assembly 20, and through the power head 18 to the nozzle 29. The pressurized circulating slurry issuing from the nozzle 29 causes the nozzle to rotate about the axis of the power head 18, as mentioned above, so that the circulating slurry is evenly distributed within the tank 10. The pump 24 is driven by any appropriate motor, not shown, which may be the motor of the truck on which the a-paratus is mounted, or which may be a separate electric motor, or which may be any other suitable drive means.

A spray hose 32 is coupled through a gas cock type output valve 34 to the outlet of the pump 24, as shown in FIG. 1. A nozzle 36 and valve 37 are provided at the remote end of the spraying hose 32. When the valve 34 is closed, the slurry is circulated through the system by the pump 24. However, when the valve 34 is opened, a portion of the circulating slurry bleeds off through the spraying hose 32 to be sprayed over the area to be covered through the valve 37 and nozzle 36, as the operator manipulates the hose. The valve 37 gives the spraying operator control so that he can turn the slurry on or off at the nozzle 36 without having to return to the machine itself to operate the valve 34.

The valve 26 is provided, for example, to facilitate fresh water flushing of the hose 32 and nozzle 36, as will be described, and also to build up a high pressure at the spray nozzle 36, if so desired. For example, when the valve 26 is closed, the pump 24 operates to draw the slurry out of the tank 10, and if the output valve 34 is opened, the pump will discharge the slurry at high pressure through the hose 32 and spraying nozzle 36.

When make-up water is needed, and when no pressurized source is available, the mechanism such as shown in FIG. 2 is activated. The mechanism includes a reservoir 50 for fresh water, and which may be separate from the equipment, or which may be a lake or stream; or which may be carried, for example, on the truck on which the equipment is mounted. A line 52 extends from the reservoir 50 and is coupled into the interior of the tank 10 through any appropriate coupling 54. A further L-shaped pipeline 56 is provided in the interior of the tank 10, and the pipeline 56 may be composed of an appropriate plastic material, such as polyvinyl chloride, or other suitable material may be used.

The pipe 56 is coupled to the coupling 54 through a flexible coupling 58, which may, for example, be a length of rubber hose clamped to the coupling 54 and to the pipe 56. The remote end of the pipe 56 extends through the opening in the bottom of the tank 10, and a tubular rubber plunger 60, or a seal of other appropriate material, is provided at the remote end of the pipe 56. It will be appreciated that when the pipe 56 is lifted up out of the aperture in the bottom of the tank 10, the slurry in the tank is free to be circulated through the system in the manner described above.

However, when the pipe 56 is dropped into the opening in the bottom of the tank 10, and sealed by the seal 60, the pump 24 then draws fresh water into the system from the reservoir 50. This fresh water can be circulated into the system for make-up purposes, by opening the valve 26 and by closing the valve 34 in the system of FIG. 1. Alternately, the water from the reservoir 50 may be used to provide a rinse for the spray hose 32 and nozzle 36, by closing the valve 26 and by opening the valve 34. This provides a simple and inexpensive way of transferring the suction of the pump from the tank 10 to the reservoir 50.

The pipeline 56 may be moved, for example, by means of a line 62 and an external handle 64. The handle may be used to pull up the pipe 56 out of the opening in the bottom of the tank 10 for normal operation of the system, and to permit the pipe 56 to drop down into the opening in the bottom of the tank 10, when make-up water from the reservoir 50 is desired, for the purposes described above. Since the suction created during the operation of the system is too large to be overcome merely by pulling on the handle 64, a by-pass valve 66 is needed, which when in the open position allows air to enter the pipeline 56 from the atmosphere, thus breaking the pump suction and allowing easy removal of the pipeline 56 and seal 60 from the outlet at the bottom of the tank. When suction is required, the valve 66 is closed.

For a more inexpensive installation, the valve 66 may be replaced by a simple hole in the pipeline 52. In such a case, the operator merely places his finger or thumb over the hole when it is desired to create the necessary suction so that the pump will draw water into the system, either to fill the tank 10, or for rinsing purposes. This provides a simple control, since the operator can stop the drawing of water into the system merely by removing his thumb. This latter control is preferable to the valve 66 since it forces the operator to remain with his thumb over the hole which water is being drawn into the tank. In this way the operator can observe the water level and stop the operation when it reaches the desired height so as to prevent overflow. Then, the resulting relief in suction permits him to pull the pipe 56 and seal 60 out of the outlet at the bottom of the tank.

The invention provides, therefore, an improved agricultural apparatus which is essentially a self-contained assembly, and which may be driven or hauled to a selected site. The apparatus may conveniently be mounted on a small pick-up truck, or on a separate trailer, as desired. When the apparatus is transported to a particular site, it may be simply operated to provide a pressurized stream of a slurry composed of mulch, fertilizer and seed to a spray hose having a nozzle at its remote end. The operator then directs the spray from the nozzle over the area to be covered by the slurry. As described, the apparatus has the feature of being operable in areas where there is no readily available water supply, since it is capable of carrying its own reservoir, and of using its own circulating pump to supply water from the reservoir to the system.

While a particular embodiment of the invention has been shown and described, modifications may be made, and it is intended in the following claims to cover all such modifications which come within the spirit and scope of the invention.

What is claimed is:

1. In agricultural apparatus for providing a mixture of mulch, seed, fertilizer, or the like, to a selected area to be cultivated, said apparatus including a tank forming a reservoir for a slurry of the aforementioned mixture and water, and said tank having an inlet at the top thereof and an outlet at the bottom thereof, and further including a pump having an intake and an outlet, pipeline means coupling the outlet of said tank to the inlet of said pump, and further pipeline means coupling the outlet of said pump to the inlet of said tank, the combination of: a make-up pipeline extending into said tank; a further pipeline positioned within said tank; flexible coupling means connecting the inner end of said make-up pipeline to said further pipeline; and control means coupled to said further pipeline to cause the free end thereof selectively to drop into the outlet at the bottom of said tank selectively to couple the intake of said pump to a source of make-up water.

2. The combination defined in claim 1, and which includes tubular sealing means at said free end of said further pipeline.

3. The combination defined in claim 1, in which said control means includes a handle positioned externally to said tank, and a line connecting said handle to said free end of said further pipeline.

4. The combination defined in claim 1, and which includes means in said make-up pipeline for opening said pipeline to the atmosphere so as to break the suction to the intake of said pump.

5. The combination defined in claim 4, in which said last-named means comprises a valve.

6. The combination defined in claim 4, in which said make-up pipeline has an aperture therein to provide the last-named means.

* * * * *